United States Patent
Lim et al.

(10) Patent No.: US 10,569,226 B2
(45) Date of Patent: Feb. 25, 2020

(54) SIDE-FLOW TYPE RO FILTER WITH EXTENDED FLUID TRANSFER PATH

(71) Applicant: PICOGRAM CO., LTD., Bucheon-si (KR)

(72) Inventors: Sung Taek Lim, Gimpo-si (KR); Hyun Ki Hong, Gyeyang-gu (KR)

(73) Assignee: PICOGRAM CO., LTD., Bucheon-si (KR)

( * ) Notice: Subject to any disclaimer, the term of this patent is extended or adjusted under 35 U.S.C. 154(b) by 111 days.

(21) Appl. No.: 16/060,511

(22) PCT Filed: Oct. 19, 2016

(86) PCT No.: PCT/KR2016/011748
§ 371 (c)(1),
(2) Date: Jun. 8, 2018

(87) PCT Pub. No.: WO2017/115985
PCT Pub. Date: Jul. 6, 2017

(65) Prior Publication Data
US 2018/0353910 A1    Dec. 13, 2018

(30) Foreign Application Priority Data

Dec. 29, 2015   (KR) ........................ 10-2015-0188765
Mar. 4, 2016   (KR) ........................ 10-2016-0026115

(51) Int. Cl.
*B01D 63/10*   (2006.01)
*B01D 61/02*   (2006.01)
(Continued)

(52) U.S. Cl.
CPC ........... *B01D 63/10* (2013.01); *B01D 63/103* (2013.01); *C02F 1/441* (2013.01); *B01D 61/025* (2013.01);
(Continued)

(58) Field of Classification Search
CPC ............ B01D 2313/04; B01D 2313/10; B01D 2313/143; B01D 2315/10; B01D 61/025;
(Continued)

(56) References Cited

FOREIGN PATENT DOCUMENTS

JP    2008183561 A    8/2008
KR    20-2011-0001828 U    2/2011
(Continued)

*Primary Examiner* — Dirk R Bass
(74) *Attorney, Agent, or Firm* — Edwin A. Sisson, Attorney at Law, LLC; Jeffrey J. Banyas

(57) ABSTRACT

A side-flow type RO filter is provided including a filter housing including a top-open housing and a bottom-open cap coupled to an opening of the housing, where a raw water inlet port, a purified water outlet port and a concentrated water outlet port are formed in the filter housing; an RO filter provided inside the filter housing with a reverse osmosis membrane sheet wound in a roll-type; and a central pipe provided in a center portion of the RO filter and an exit thereof is connected to the purified water outlet port, the central pipe being configured to collect the purified water that passes a peneratrion hole after being purified by the reverse osmosis membrane sheet and transfer the purified water to the purified water outlet port, wherein the RO filter is configured to transfer the raw water introduced through an outside end of the reverse osmosis membrane sheet in a longitudinal direction of the reverse osmosis membrane sheet thereby extending the transfer path of the raw water and separate the raw water into purified water that passes the reverse osmosis membrane sheet and concentrated water filtered by the reverse osmosis membrane sheet to be transferred to the concentrated water outlet port.

10 Claims, 7 Drawing Sheets

(51) Int. Cl.
*B01D 61/08* (2006.01)
*C02F 1/44* (2006.01)

(52) U.S. Cl.
CPC .......... *B01D 61/08* (2013.01); *B01D 2313/04* (2013.01); *B01D 2313/10* (2013.01); *B01D 2313/143* (2013.01); *B01D 2315/10* (2013.01)

(58) Field of Classification Search
CPC ...... B01D 61/08; B01D 63/10; B01D 63/103; C02F 1/441
See application file for complete search history.

(56) References Cited

FOREIGN PATENT DOCUMENTS

| | | |
|---|---|---|
| KR | 10-2013-0068559 A | 6/2013 |
| KR | 10-2014-0147972 A | 12/2014 |
| KR | 10-2015-0121779 A | 10/2015 |

SIDE-FLOW TYPE RO FILTER WITH EXTENDED FLUID TRANSFER PATH

PRIORITIES AND CROSS REFERENCES

This application claims priority from International Application No. PCT/KR2016/011748 filed on 19 Oct. 2016 which claims priority from Korean Application No. 10-2016-0026115 filed on 4 Mar. 2016 and Korean Application No. 10-2015-0188765 filed on 29 Dec. 2015, the teachings of each of which are incorporated by reference herein in their entirety.

TECHNICAL FIELD

The present disclosure relates to an RO filter (reverse osmosis filter) with extended fluid transfer path that filters harmful foreign substances included in the raw water such as the tap water in order to separate the raw water into purified water and concentrated water for discharge.

BACKGROUND

As illustrated in FIGS. 1 and 2A, an RO filter is implemented as a spiral wound type module in which various kinds of membranes are spirally wound around a central pipe 4. The reverse osmosis membrane filter 1 includes a filtering member 2, a pair of raw water spacers 3 that is respectively disposed on both sides of the filtering member 2, the filtering member 2 and the raw water spacers 3 being spirally wound around the central pipe 4, and an outer wrap 5 that is made of a non-woven fabric and surrounds the outer circumferential surface of the reverse osmosis membrane filter 1 to maintain the shape of the reverse osmosis membrane filter 1.

In raw water introduced into the reverse osmosis membrane filter 1 through the raw water spacer 3, purified water which has been filtered while passing through the surface of the filtering member 2 is fed toward the center of the filtering member 2 and then is discharged to the outside through a purified water outlet port 7 formed at one side of the central pipe 4 through a plurality of penetration holes 6 formed in the central pipe 4.

In the raw water introduced into the reverse osmosis membrane filter 1 through the inner or outer raw water spacer 3, concentrated water which has been concentrated while not passing through the surface of the filtering member 2 continues to be moved in the reverse osmosis member filter 1 through the raw water spacer 3 and then is discharged to the outside through concentrated water outlet ports 8 radially formed around the purified water outlet port 7 of the central pipe 4.

The filtering member 2 has a structure in which a purified water spacer 11 is installed between a first membrane 9 and a second membrane 10 so that the purified water which has passed through the first membrane 9 or the second membrane 10 is gradually fed to the central pipe 4 along the purified water spacer 11 and then is discharged to the outside through the penetration holes 6 formed in the central pipe 4. In this case, either the first membrane 9 or the second membrane 10 is generally formed as a reverse osmosis membrane, but both the first membrane 9 and the second membrane 10 may be formed as the reverse osmosis membranes. The reverse osmosis membrane filter 1 is formed as a reverse osmosis membrane having a pore size of 0.0001 microns, and thus it is used to filter heavy metals such as lead and arsenic, sodium, various kinds of pathogens.

As illustrated in FIG. 2B, the raw water and the concentrated water are fed in a width direction, rather than in a length direction, of the reverse osmosis membrane sheet. As the raw water is fed in a transverse direction (a width direction) of the reverse osmosis membrane sheet, the residence time of the raw water which comes into contact with the surface of the reverse osmosis membrane sheet is shortened.

As a consequence, the amount of the purified water filtered while passing through the reverse osmosis membrane filter 1 and then discharged to the outside through the purified water outlet port 7 is relatively small compared to the amount of the raw water introduced into the reverse osmosis membrane filter 1 through the raw water spacer 3. The ratio of the amount of the purified water discharged to the amount of the raw water introduced is generally 3:1. Thus, the recovery rate of the purified water is disadvantageously very low.

Korean Patent Application No. 10-2011-7006006 discloses a spiral-wound type reverse osmosis membrane.

As illustrated in FIG. 3, in the spiral-wound type reverse osmosis membrane, a purification membrane 11 is wound around the outer peripheral side of the central pipe, and both sides of the reverse osmosis membrane 10 are sealed by the ring-shape cover 600. The raw water is introduced through the raw water inlet port 214 formed between the outer peripheral of the central pipe and the ring-shape cover 600.

Accordingly, the purified water purified by the purification membrane 11 is collected in the central pipe to be discharged, and the concentrated water containing the foreign substances that was not able to pass the purification membrane 11 is discharged through the concentrated water outlet port formed at the sides of the water introducing path corresponding to a curved portion.

In the spiral-wound type reverse osmosis membrane, since raw water is introduced in a predefined direction, that is, through two raw water inlet ports formed at both ends of the reverse osmosis membrane 10, it is necessary to use a dedicated filter housing designed in conformity with the structure of the reverse osmosis membrane 10. As a result, the productivity of manufacturing the filter housing.

Moreover, the spiral-wound type reverse osmosis membrane has a structure in which the raw water inlet ports 214 are formed at both ends of the reverse osmosis membrane 10 to be distributed, and as a result, a drift may occur when the raw water is introduced to the reverse osmosis membrane 10, which is also problematic.

DETAILED EXPLANATION OF THE INVENTION

Problems to be Solved

One of the objects of the present disclosure is to solve the problems described above and provide a side-flow type RO filter having extended fluid transfer path in which the raw water is passed along with the length direction of the reverse osmosis membrane of the RO filter to filter the foreign substances included in the raw water. As a result, the transfer path of the fluid is extended and the purification efficiency is improved.

Another object of the present disclosure is to provide a side-flow type RO filter with extended fluid transfer path where dedicated filter housing for the RO filter is not necessary.

Yet, another object of the present disclosure is to provide a side-flow type RO filter with extended fluid transfer path where the raw water introduced to the filter housing through a raw water inlet port is introduced in a single direction through the edge of the side surfaces of the RO filter.

Means to Solve the Problems

According to an embodiment of the present disclosure, a side-flow type RO filter with extended fluid transfer path is provided.

The side-flow type RO filter of the present disclosure includes a central pipe in which a penetration hole is formed in a radial direction to which the purified water is introduced and one end of the central pipe is closed.

A reverse osmosis membrane sheet is spirally wound along the outside of the central pipe and the raw water introduced through the outside end of the reverse osmosis membrane sheet is transferred in a longitudinal direction for purification. The purified water is transferred to the inside of the central pipe through the penetration hole and the concentrated water filtered by the reverse osmosis membrane sheet is transferred to the discharge hole formed by adjoining the outside surface of the central pipe.

The side-flow type RO filter with extended fluid transfer path also includes a feed screen disposed at the center of the reverse osmosis membrane sheet in order to secure the transfer path of the raw water introduced through the outside end.

According to another embodiment of the present disclosure, a side-flow type RO filter with extended fluid transfer path is provided.

The side-flow type RO filter of the present disclosure includes a filter housing including a top-open housing and a bottom-open cap coupled to an opening of the housing, where a raw water inlet port, a purified water outlet port and a concentrated water outlet port are formed in the filter housing.

An RO filter is provided inside the filter housing transferring the raw water introduced to the side surface through the outside end of the reverse osmosis membrane sheet wound in a roll type in the longitudinal direction of the reverse osmosis membrane sheet and separating the raw water into a purified water that passes through the reverse osmosis membrane sheet to be purified and a concentrated water that is filtered by the reverse osmosis membrane sheet to move to the concentrated water outlet port.

The side-flow type RO filter with extended fluid transfer path of the present disclosure also includes a central pipe formed at the center of the RO filter and an exit thereof is connected to the purified water outlet port. The central pipe collects the purified water that passes through the penetration hole after being purified by the reverse osmosis membrane sheet and transfers the purified water to the purified water outlet port.

Effects of Disclosure

The embodiments discussed above have the following effects.

Since the foreign substances included in the raw water such as the tap water are filtered while the raw water is being passed in the longitudinal direction of the reverse osmosis membrane sheet of the RO filter, the amount of purified water increases thereby improving the efficiency of water purification.

Also, since a dedicated filter housing for the RO filter is not required thereby improving the productivity of manufacturing the filter housing.

Further, the raw water introduced into the filter housing through the raw water inlet port is introduced through the wide surface of the side peripheral portion of the RO filter in a single direction. As a result, the amount of purified water increases thereby improving the efficiency of water purification.

DESCRIPTION OF EMBODIMENTS

Hereinafter, an exemplary embodiment of a side-flow type RO filter with extended fluid transfer path according to the present disclosure will be described in detail with reference to accompanying drawings.

Figure 4A:
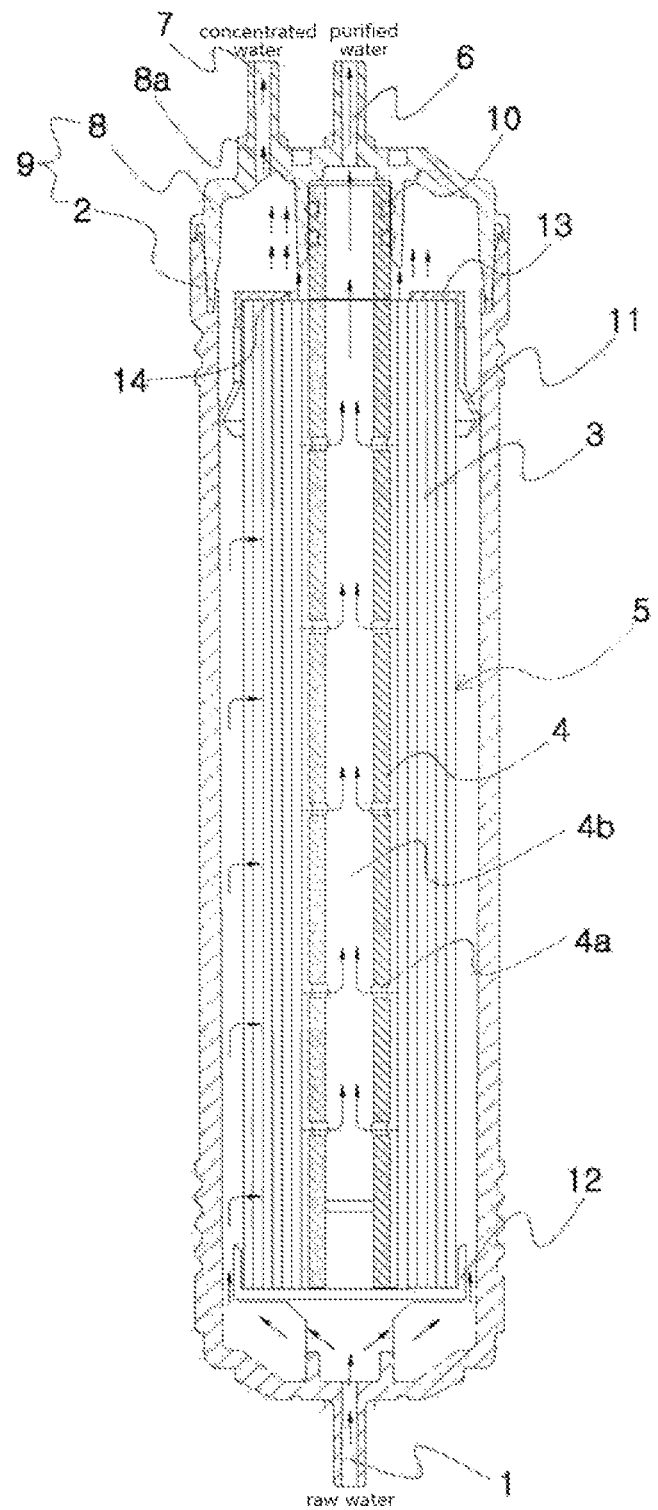
FIG. 4 illustrates a side-flow type RO filter with extended fluid transfer path according to an embodiment of the present disclosure.
Figure 4B:
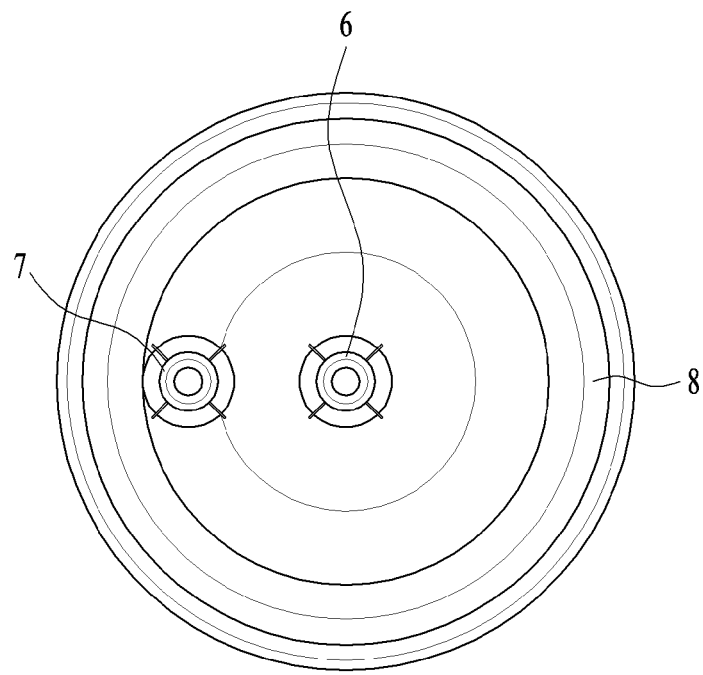
Figure 4C:
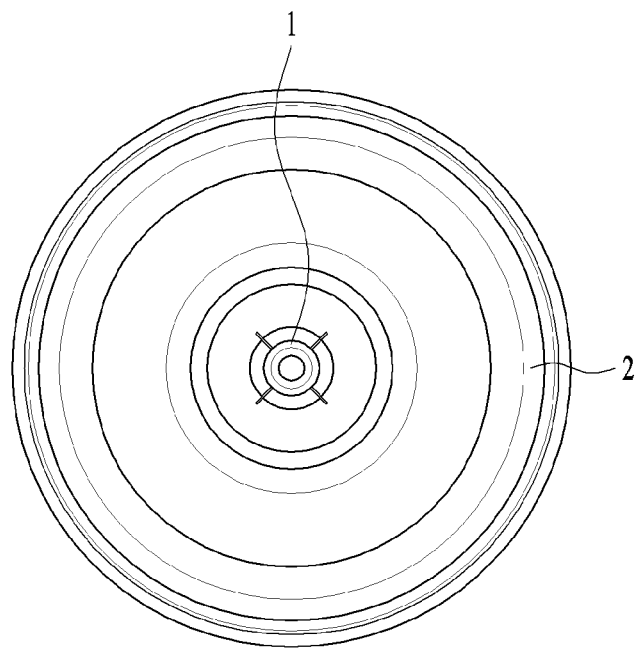
Figure 4D:
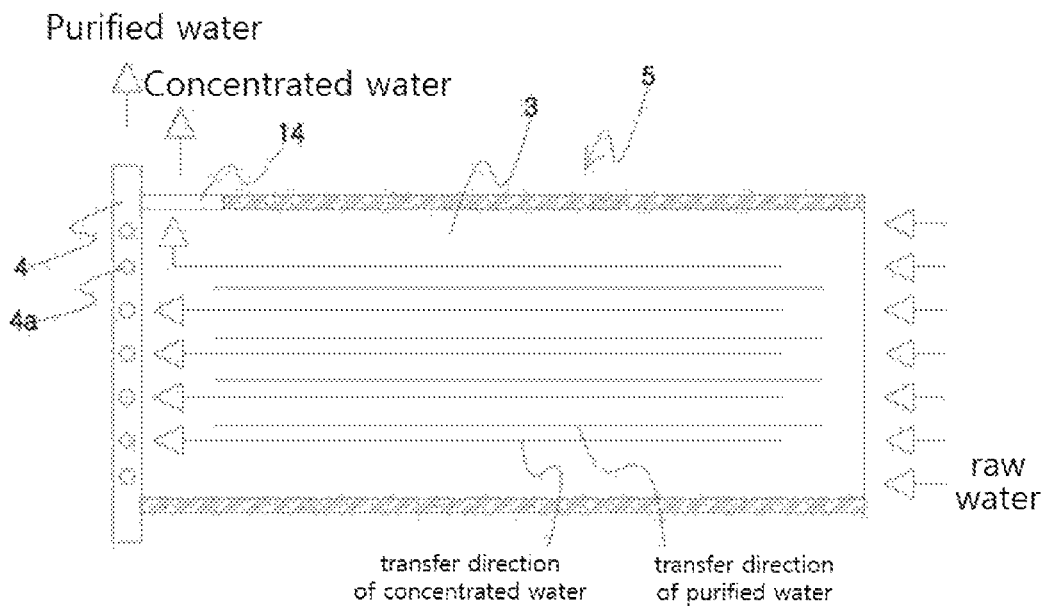

FIG. 4A illustrates a schematic diagram of a side-flow type RO filter with extended fluid transfer path according to an embodiment of the present disclosure, FIG. 4B illustrates a top view of the RO filter, FIG. 4C illustrates a bottom view of the RO filter, and FIG. 4D explains how the fluid transfer path is extended.

Referring to FIG. 4, a side-flow type RO filter with extended fluid transfer path is provided.

The side-flow type RO filter includes a central pipe 4 in which a penetration hole 4a to which the purified water is introduced is formed along a radial direction and one end of the central pipe 4 is closed.

A reverse osmosis membrane sheet 3 is spirally wound along the outside of the central pipe 4. The raw water introduced through the outside end of the reverse osmosis membrane sheet 3 is transferred in a longitudinal direction for purification. The purified water is transferred to the inside of the central pipe 4 through the penetration hole 4a. The concentrated water filtered by the reverse osmosis membrane sheet 3 is transferred to the discharge hole 14 formed by adjoining the outside surface of the central pipe 4.

The side-flow type RO filter with extended fluid transfer path also includes a feed screen (not shown) disposed at the center of the reverse osmosis membrane sheet 3 (e.g., between sack shape sheets) in order to secure the transfer path of the raw water introduced through the outside end.

The RO filter 5 has following features. The RO filter 5 is provided such that one end thereof is sealed and the other end thereof is also sealed except for the discharge hole 14. The RO filter 5 is configured such that the purified water that went through a purification process in which the raw water introduced through the outside end to be transferred in a longitudinal direction is purified by the reverse osmosis membrane sheet 3 and transferred to the central pipe 4. In the meantime, the concentrated water filtered by the reverse osmosis membrane sheet 3 is transferred to the discharge hole 14.

The side-flow type RO filter with extended fluid transfer path according to an embodiment of the present disclosure may include a filter housing including a top-open housing and a bottom-open cap coupled to an opening of the housing. A raw water inlet port, a purified water outlet port and a concentrated water outlet port are formed in the filter housing. The filter housing may be formed to have a nipple-type structure of both directions, in which the raw water inlet port, the purified water outlet port and the concentrated water outlet port are formed at both the housing and the cap in a distributed manner, or a nipple-type structure of a single direction, in which the raw water inlet port, the purified water outlet port and the concentrated water outlet port are formed at either the housing or the cap.

Referring to FIG. 4, the side-flow type RO filter with extended fluid transfer path according to an embodiment of the present disclosure is formed with a nipple-type structure of both directions.

The side-flow type RO filter includes a filter housing 9 including a housing 2 in which a nipple-type raw water inlet port 1 is formed to introduce the raw water such as the tap water, and a cap coupled to an opening of the housing 2 in which a nipple-type purified water outlet port 6 and a nipple-type concentrated water outlet port 7 are formed.

An RO filter 5 is provided inside the filter housing 9 transferring the raw water introduced into the side surface of the outside end of the reverse osmosis membrane sheet 3 wound in a roll type in the longitudinal direction of the reverse osmosis membrane sheet 3. The raw water is separated into purified water that passes through the fine holes of the reverse osmosis membrane sheet 3 to be purified and concentrated water that is filtered (not able to be passed) by the reverse osmosis membrane sheet 3 to be transferred to the concentrated water outlet port 7.

A central pipe 4 is provided at the center of the RO filter 5 with an exit thereof is connected to the purified water outlet port 6. The central pipe 4 collects the purified water that passes the penetration hole 4a after being purified by the reverse osmosis membrane sheet 3 and transfers the purified water to the purified water outlet port 6.

An o-ring 10 may be provided at a peripheral side of the exit of the centra pipe 4 that adheres to an extended internal port 8a formed to be extended in a vertical direction at the cap 8. The o-ring 10 is a provision to prevent the purified water inside the central pipe 4 from being mixed with the concentrated water discharged from the reverse osmosis membrane sheet 3.

A shell 11 may be provided at an upper peripheral side of the RO filter 5 in order to prevent the raw water introduced into the side surface of the reverse osmosis membrane sheet 3 of the RO filter 5 from being mixed with the concentrated water discharged from the reverse osmosis membrane sheet 3.

Although not illustrated in the drawings, the lower end of the RO filter 5 may be bonded by an ordinary adhesive for a sealing treatment in order to prevent the raw water introduced to the filter housing 9 through the raw water inlet port 1 from being introduced directly to the reverse osmosis membrane sheet 3 through the lower end thereof.

A lower holder 12 may be provided for a sealing treatment of the lower end of the RO filter 5 in order to prevent the raw water introduced into the filter housing 9 through the raw water inlet port 1 from being introduced directly to the reverse osmosis membrane sheet 3 through the lower end of the RO filter 5. The lower holder 12 may also tightly fix the reverse osmosis membrane sheet 3 to prevent the reverse osmosis membrane sheet 3 from being deformed with the passage of usage time.

The lower holder 12 may also be provided by applying an adhesive to the lower end of the RO filter 5 or a contact surface of the lower holder 12 and the RO filter 5 to then be bonded with the RO filter 5.

Although not illustrated in the drawings, a sealing treatment may be performed to the upper end of the RO filter 5 by bonding with an ordinary adhesive in order to prevent the concentrated water discharged from the reverse osmosis membrane sheet 3 through the discharge hole 14 from being flowed to the upper end of the reverse osmosis membrane sheet 3 (the upper end of the reverse osmosis membrane sheet 3 except for the discharge hole 14 may be bonded).

An upper holder 13 may be provided for a sealing treatment of the upper end of the reverse osmosis membrane sheet 3 of the RO filter 5 in order to prevent the concentrated water discharged from the reverse osmosis membrane sheet 3 of the RO filter 5 from being flowed backwardly to the upper end of the reverse osmosis membrane sheet 3. The upper holder 13 may also tightly fix the reverse osmosis membrane sheet 3 to prevent the reverse osmosis membrane sheet 3 from being deformed with the passage of usage time.

The upper holder 13 may also be provided by applying an adhesive to the upper end of the RO filter 5 or a contact surface of the upper holder 13 and the RO filter 5 to then be bonded with the RO filter 5.

The discharge hole 14 may be provided in between the outer peripheral of the central pipe 4 and an inner peripheral of the upper holder 13 in order to transfer the concentrated water discharged from the reverse osmosis membrane sheet 3 of the RO filter 5 to the concentrated water outlet port 7.

The size of the discharge hole 14 with respect to the inlet port (not numerated) that introduces the raw water through the outside end of the reverse osmosis membrane sheet 3 of the RO filter 5 ranges from 1:0.5 to 1:3.0.

When the size of the discharge hole 14 is equal to or less than half ($\frac{1}{2}$) of the inlet port, the flowing speed of the raw water that passes the reverse osmosis membrane sheet 3 of the RO filter 5 is decreased such that the impurities may be accumulated on the surface of the reverse osmosis membrane sheet 3 and the flowing of the raw water may be interrupted.

In contrast, when the size of the discharge hole 14 is equal to or larger than 3 times of the inlet port, the surface area of the reverse osmosis membrane sheet 3 that contacts with the raw water is decreased, and the length of stay of the raw water is shortened in the RO filter 5 thereby decreasing the efficiency of water purification.

Figure 1:
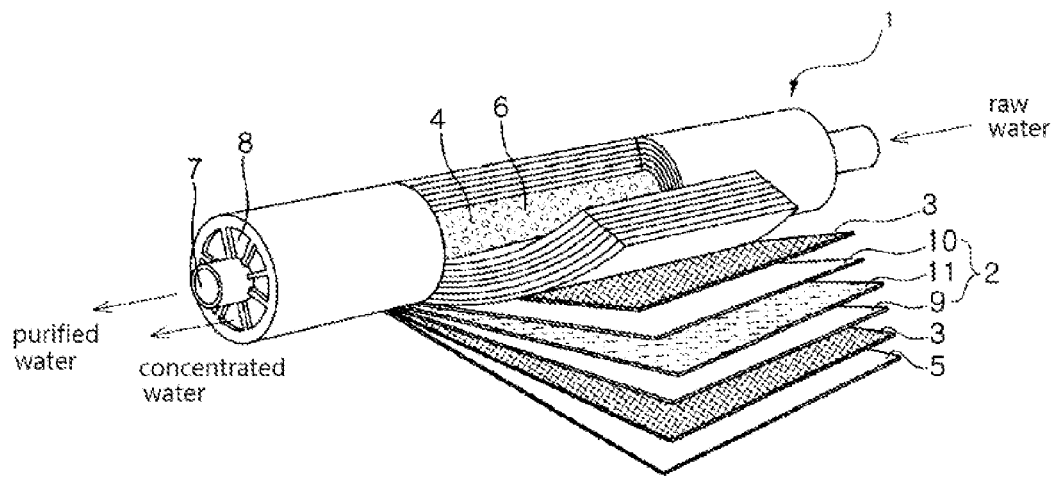
FIGS. 1, 2 and 3 illustrate a side RO filter in a related art.
Figure 2A:
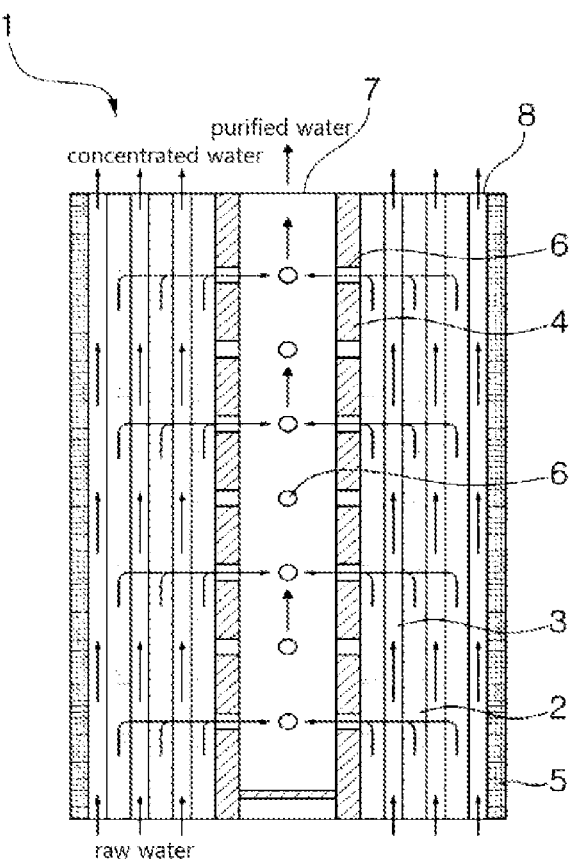
Figure 2B:
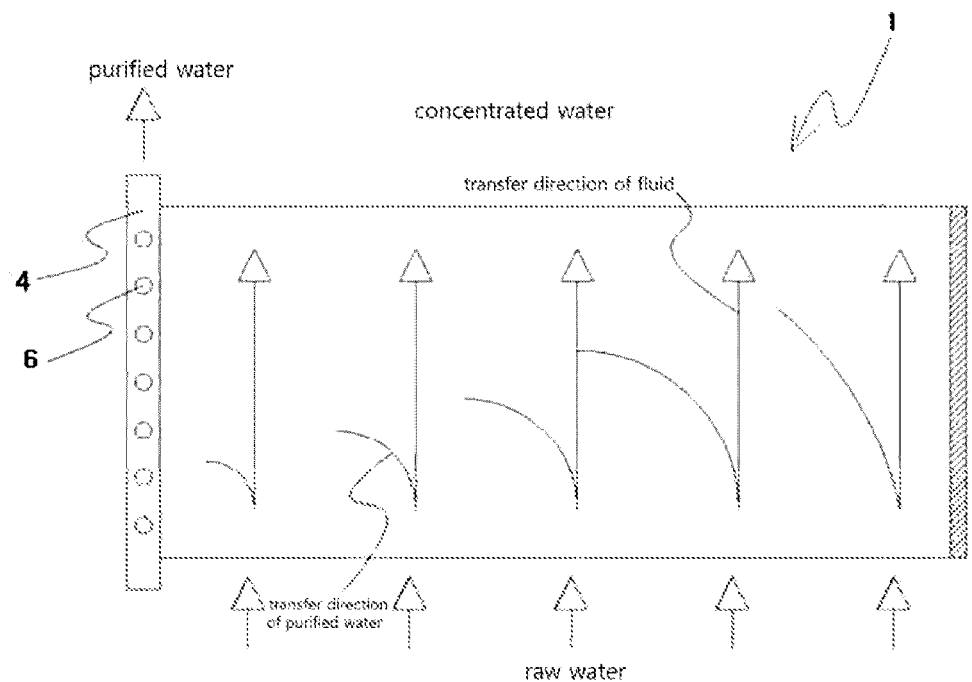
Figure 3:
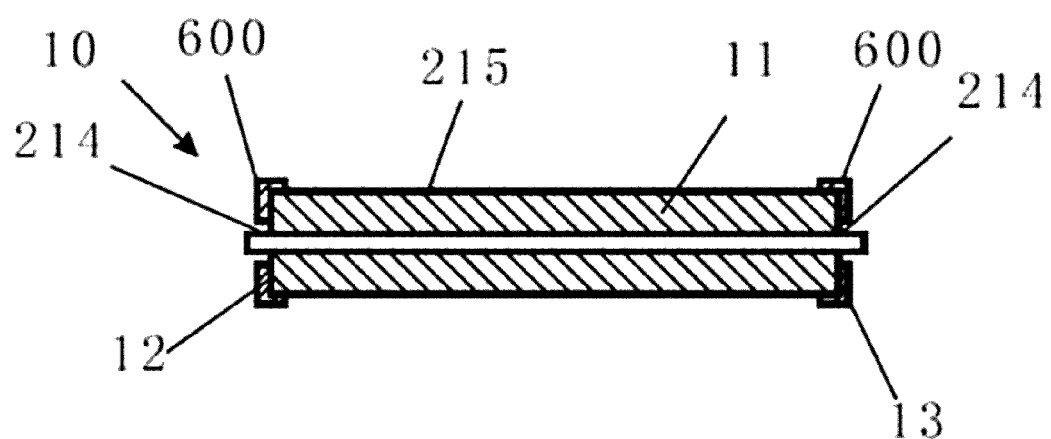

The constitution of the RO filter 5 that is formed in the filter housing 9 and filters the harmful foreign substances included in the raw water to divide the raw water into the purified water and the concentrated water is substantially the same as the RO filter of the related art as illustrated in FIGS. 1 and 2. As such, detailed descriptions thereof are omitted.

Figure 5:
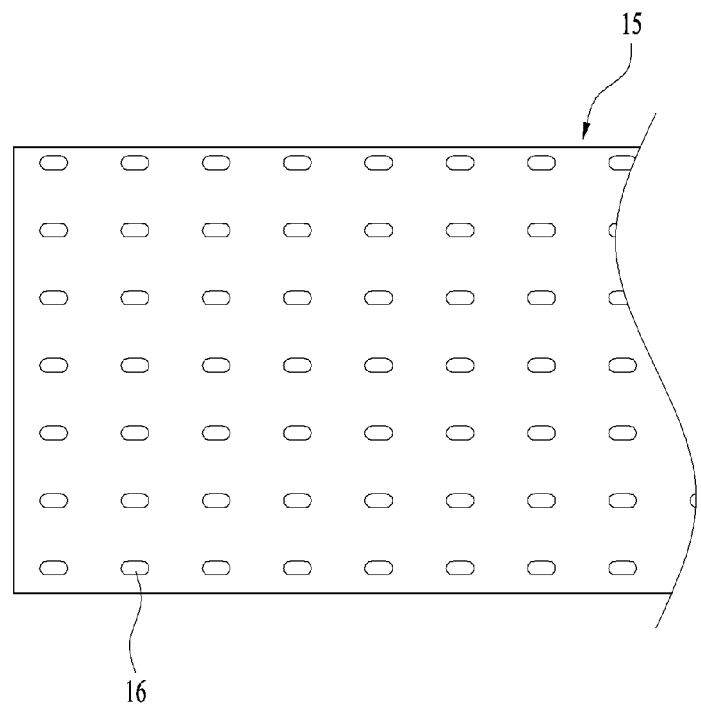
FIG. 5 illustrates an outer wrap of the RO filter according to an embodiment of the present disclosure.

An outer wrap (not shown) may be formed on the outer circumferential surface of the RO filter 5 spirally wound around an outside of the central pipe 4. The outer wrap may fix the RO filter 5 to prevent the spirally wound structure from unwinding during the process of manufacturing the RO filter 5. As illustrated in FIG. 5, raw water inflow holes 16 may be formed on the outer wrap 15 of the RO filter. The method for forming raw water inflow holes is not particularly limited to that of the present disclosure, and the types and numbers of the raw water inflow holes are not particularly limited to those of the present disclosure. In a case where the inflow holes are uniformly formed throughout the outer wrap, raw water can be introduced at a high flowing speed, thereby attaining a waste accumulation preventing effect.

Hereinafter, an exemplary usage of the side-flow type RO filter with extended fluid transfer path according to an embodiment of the present disclosure will be described in detail with reference to accompanying drawings.

As illustrated in FIG. 4, when the raw water such as the tap water is introduced into the filter housing 2 through the raw water inlet port 1, the raw water is transferred to the upper direction (as seen from the drawings) along with the transfer path formed between the RO filter 5 and the housing 2. The raw water is then introduced into the side surface of the RO filter 5 through the outside end of the reverse osmosis membrane sheet 3 formed as a roll-type (the transfer direction of the raw water is indicated with arrows in the drawings).

At this time, the raw water introduced into the filter housing 9 through the raw water inlet port 1 is prevented from being introduced directly into the reverse osmosis membrane sheet 3 by the lower holder 12 with a sealing treatment at the lower end of the RO filter 5.

After the raw water introduced into the filter housing 9 is introduced through the side surface of the roll-type RO filter 5, the raw water is transferred along a longitudinal direction of the reverse osmosis membrane sheet 3. As a result, the raw water that has been transferred in a longitudinal direction of the reverse osmosis membrane sheet 3 passes the fine holes of the reverse osmosis membrane sheet 3 to be purified. The purified water then passes the penetration hole 4a of the central pipe 4 to be collected in the purified water transfer path 4b.

The purified water collected in the purified water transfer path 4b is transferred to the upper direction (as seen from the drawing) and may be discharged from the filter housing 9 through the purified water outlet port 6 of the cap 8.

In contrast, the concentrated water that was not able to pass the fine holes of the reverse osmosis membrane sheet 3 and filtered is transferred in the longitudinal direction of the reverse osmosis membrane sheet 3, and is discharged through the discharge hole 14 formed in between the inner peripheral of the upper holder 13 having a sealing treatment at the upper end of the reverse osmosis membrane sheet 3 and the outer peripheral of the central pipe 4.

The concentrated water discharged from the RO filter 5 through the discharge hole 14 may be discharged from the filter housing 9 through the concentrated water outlet port 7 of the cap 8.

At this time, the raw water introduced into the reverse osmosis membrane sheet 3 of the RO filter 5 is prevented from being mixed with the concentrated water discharged from the RO filter 5 through the discharge hole 14 by the shell 11 provided in the upper peripheral of the RO filter 5.

Also, by the upper holder 13 formed with a sealing treatment at the upper end of the reverse osmosis membrane sheet 3 of the RO filter 5, the concentrated water that has been discharged from the reverse osmosis membrane sheet 3 to be transferred to the concentrated water outlet port 7 of the cap 8 is prevented from being flowed backwardly to be introduced into the reverse osmosis membrane sheet 3 of the RO filter 5.

Moreover, by the o-ring 10 that is disposed at the peripheral of the exit side of the central pipe 4 to seal the gap between the central pipe 4 and the extended internal port 8a of the cap 8, the purified water that has been transferred to the purified water outlet port 6 of the cap 8 through the exit of the central pipe 4 is prevented from being mixed with the concentrated water that is transferred from the reverse osmosis membrane sheet 3 to the concentrated water outlet port 7 of the cap 8.

Figure 6:
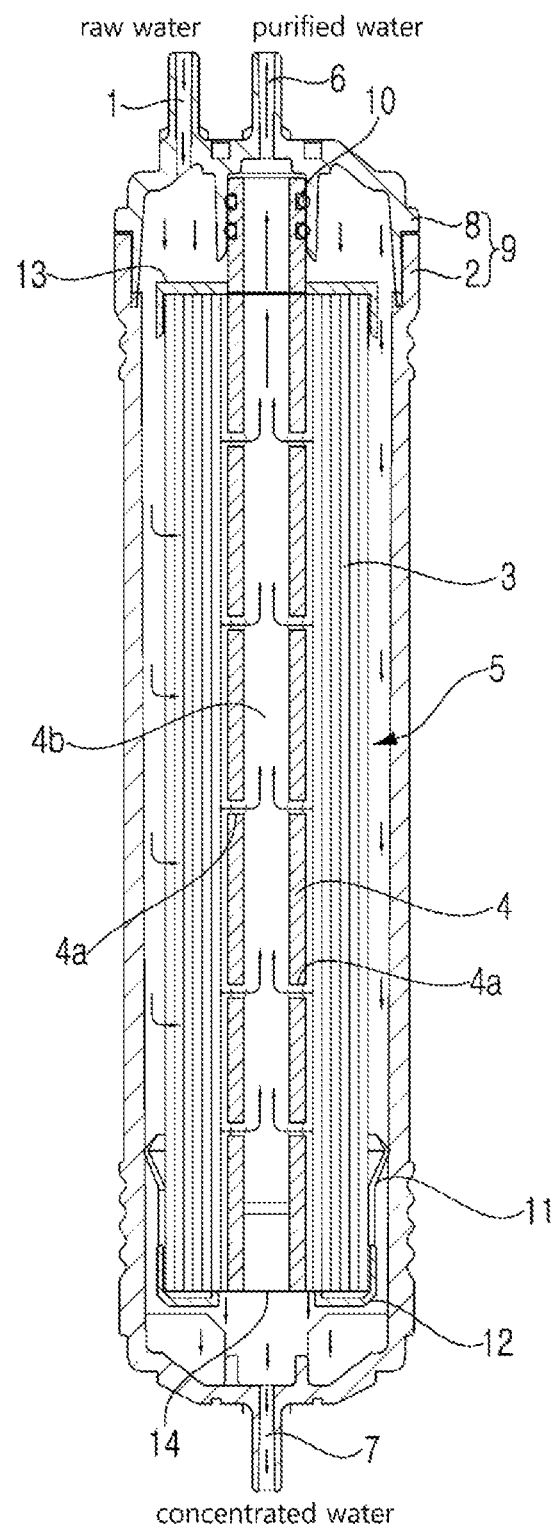
FIG. 6 is a schematic diagram of a side-flow type RO filter with extended fluid transfer path according to another embodiment of the present disclosure.

As illustrated in FIG. 6, the side-flow type RO filter with extended fluid transfer path according to another embodiment of the present disclosure is formed with a nipple structure of both directions. The RO filter is formed with a nipple-type raw water inlet port 1 and the purified water outlet port 7 at the cap 8 that forms the filter housing 9. Also, the nipple-type concentrated water outlet port 7 may be formed at the housing 2 that forms the filter housing 9.

Here, the constitution of the RO filter except for the nipple-type raw water inlet port 1 and the purified water outlet port 6 formed at the cap 8, and the nipple-type concentrated water outlet port 7 formed in the housing 2 is the same as the RO filter illustrated in FIG. 4A. Accordingly, same numerals are used for the overlapping elements and detailed descriptions thereof are omitted.

Although not illustrated in the drawings, the side-flow type RO filter having an extended fluid transfer path according to the present disclosure may be formed to have another type of a nipple structure of both directions. For example, the side-flow type RO filter according to the present disclosure may be formed to have a modified configuration of the RO filter shown in FIG. 4A. That is to say, the modified side-flow type RO filter may be configured such that a purified water outlet port is formed on a housing and a raw water inlet port is formed on a cap. Alternatively, the side-flow type RO filter according to the present disclosure may also be formed to have a modified configuration of the RO filter shown in FIG. 6. That is to say, the modified side-flow type RO filter may be configured such that a purified water outlet port is formed on a housing and a concentrated water outlet port is formed on a cap.

Figure 7:
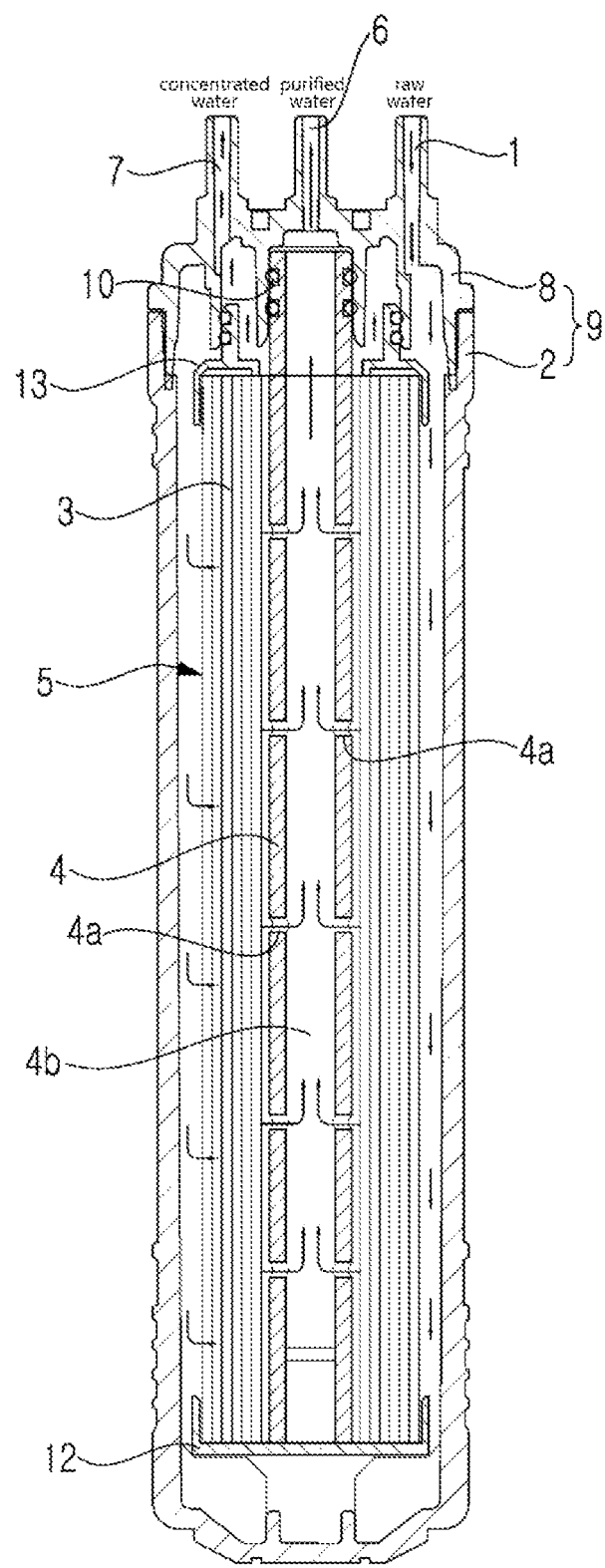
FIG. 7 is a schematic diagram of a side-flow type RO filter with extended fluid transfer path according to yet another embodiment of the present disclosure.

As illustrated in FIG. 7, the side-flow type RO filter with extended fluid transfer path according to yet another embodiment of the present disclosure is formed with a nipple structure of a single direction. The nipple-type raw water inlet port 1, the purified water outlet port 6 and the concentrated water outlet port 7 may be formed in the cap 8 that in turn forms the filter housing 9.

Here, the constitution of the RO filter except for the nipple-type raw water inlet port 1, the purified water outlet port 6 and the concentrated water outlet port 7 formed at the cap 8 is same as that of the RO filter illustrated in FIG. 4A. Accordingly, same numerals are used for the overlapping elements and detailed descriptions thereof are omitted.

Although not illustrated in the drawings, the nipple-type raw water inlet port 1, the purified water outlet port 6 and the concentrated water outlet port 7 may be formed in the housing 2 that in turn forms the filter housing 9 in a nipple structure of a single direction.

As described above, according to an embodiment of the present disclosure, the raw water introduced through the raw water inlet port 1 of the filter housing 9 is introduced to the side surface of the roll-type RO filter 5 through the outside end thereof such that the raw water is transferred in a longitudinal direction of the reverse osmosis membrane sheet 3 having a sack-shape to filter the harmful foreign substances included in the raw water by the reverse osmosis membrane sheet 3. As a result, the transfer path of the raw water is extended.

Accordingly, the purification efficiency that purifies the raw water may be improved. (In contrast, in the reverse osmosis membrane sheet 3 of the RO filter 5 of the related art as illustrated in FIG. 1, each of the upper and lower ends of the roll-type reverse osmosis membrane sheet 3 is opened and the raw water is transferred to the width direction of the reverse osmosis membrane sheet 3 for a purification. As a result, the transfer path of the raw water relatively short and the purification efficiency of the raw water may be decreased.)

In addition, in the RO filter 5, since raw water is not directly introduced to the upper and lower ends but is introduced through an outside end of the reverse osmosis membrane sheet, it is not necessary to use, as the filter housing 9 for accommodating the RO filter 5, a dedicated filter housing designed to form a direction in which raw water is introduced in conformity with the structure of the RO filter 5. Therefore, the productivity of manufacturing the filter housing 9 can be improved.

In addition, the raw water inlet port, the purified water outlet port and the concentrated water outlet port can be positioned in various combinations of arrangement, and the filter housing having a nipple structure of a single direction or both directions can be adaptively used. Therefore, configurations of the RO filter can be easily changed to be suited for the type and install location of the apparatus using the RO filter.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A side-flow type RO filter comprising:
    a central pipe in which a penetration hole through which purified water is introduced is formed in a radial direction and one end thereof is closed;
    a reverse osmosis membrane sheet wound spirally along an outside of the central pipe; and
    a feed screen disposed at a center of the reverse osmosis membrane sheet and configured to secure a transfer path of the raw water introduced through an outside end of the reverse osmosis membrane sheet,
    wherein the side-flow type RO filter is configured such that the raw water introduced through an outside end of the reverse osmosis membrane sheet is transferred in a longitudinal direction of the reverse osmosis membrane sheet to be purified thereby extending the transfer path of the raw water, the purified water is transferred to an inside of the central pipe through the penetration hole, and concentrated water filtered by the reverse osmosis membrane sheet is transferred to a discharge hole formed by adjoining an outside surface of the central pipe, and
    the side-flow type RO filter is sealed at one end thereof and the other end is sealed except for the discharge hole, and the side-flow type RO filter is configured such that:
        the raw water is introduced through an outside end of the reverse osmosis membrane sheet and transferred in a longitudinal direction of the reverse osmosis membrane sheet to be purified,
        the purified water purified by the reverse osmosis membrane sheet is transferred to the central pipe, and
        the concentrated water filtered by the reverse osmosis membrane sheet is transferred to the discharge hole.

2. The side-flow type RO filter according to claim 1, wherein an outer wrap is formed on the outer circumferential surface of the RO filter spirally wound around an outside of the central pipe.

3. The side-flow type RO filter according to claim 2, wherein raw water inflow holes are formed on the outer wrap of the RO filter.

4. A side-flow type RO filter comprising:
    a filter housing including a top-open housing and a bottom-open cap coupled to an opening of the housing, where a raw water inlet port, a purified water outlet port and a concentrated water outlet port are formed in the filter housing;
    an RO filter provided inside the filter housing with a reverse osmosis membrane sheet wound in a roll-type;
    a central pipe provided in a center portion of the RO filter and an exit thereof is connected to the purified water outlet port, the central pipe being configured to collect the purified water that passes a penetration hole after being purified by the reverse osmosis membrane sheet and transfer the purified water to the purified water outlet port,
    a lower holder formed to seal the lower end of the RO filter and configured to prevent the raw water introduced to the filter housing through the raw water inlet port from being introduced directly into the reverse osmosis membrane sheet through the lower end of the RO filter,
    an upper holder formed to seal an upper end of the reverse osmosis membrane sheet of the RO filter and configured to prevent the concentrated water discharged from the reverse osmosis membrane sheet of the RO filter from being flowed backwardly to the upper end of the reverse osmosis membrane sheet, and
    a discharge hole formed in between an outer peripheral of the central pipe and an inner peripheral of the upper holder, the discharge hole being configured to transfer the concentrated water discharged from the reverse osmosis membrane sheet of the RO filter to the concentrated water outlet port, wherein the RO filter is configured to transfer the raw water introduced through an outside end of the reverse osmosis membrane sheet in a longitudinal direction of the reverse osmosis membrane sheet thereby extending the transfer path of the raw water and separate the raw water into purified water that passes the reverse osmosis membrane sheet and concentrated water filtered by the reverse osmosis membrane sheet to be transferred to the concentrated water outlet port.

5. The side-flow type RO filter according to claim 4, further comprising an o-ring provided in a peripheral of an exit of the central pipe and configured to prevent the purified water in the central pipe from being mixed with the concentrated water discharged from the reverse osmosis membrane sheet.

6. The side-flow type RO filter according to claim 4, further comprising a shell provided in an upper peripheral portion of the RO filter and configured to prevent the raw water introduced into the reverse osmosis membrane sheet of the RO filter from being mixed with the concentrated water discharged from the reverse osmosis membrane sheet.

7. The side-flow type RO filter according to claim 4, a size of the discharge hole with respect to the inlet port that introduces the raw water through an outside end of the reverse osmosis membrane sheet of the RO filter ranges from 1:0.5 to 1:3.0.

8. The side-flow type RO filter according to claim 4, wherein the filter housing is formed to have a nipple-type structure of both directions, in which the raw water inlet port, the purified water outlet port and the concentrated water outlet port are formed at both the housing and the cap in a distributed manner, or a nipple-type structure of a single direction, in which the raw water inlet port, the purified water outlet port and the concentrated water outlet port are formed at either the housing or the cap.

9. The side-flow type RO filter according to claim 4, wherein the lower end of the RO filter is bonded with an adhesive for a sealing treatment in order to prevent the raw water introduced into the filter housing through the raw water inlet port from being introduced directly into the reverse osmosis membrane sheet through the lower end of the reverse osmosis membrane sheet.

10. The side-flow type RO filter according to claim 4, wherein the upper end of the RO filter except for the discharge hole is bonded with an adhesive for a sealing treatment in order to prevent the concentrated water discharged through the discharge hole from the reverse osmosis membrane sheet from being flowed backwardly to be introduced to the upper end of the reverse osmosis membrane sheet.

* * * * *